United States Patent
Yodokawa et al.

(10) Patent No.: US 7,665,499 B2
(45) Date of Patent: Feb. 23, 2010

(54) LAMINATING APPARATUS FOR CERAMIC GREEN SHEET AND LAMINATING METHOD FOR SAME

(75) Inventors: Yoshimi Yodokawa, Nikaho (JP); Susumu Nakamura, Nikaho (JP); Kikuo Takahashi, Nikaho (JP); Makoto Takahashi, Nikaho (JP); Hiroshi Yagi, Nikaho (JP); Tsukasa Satoh, Nikaho (JP)

(73) Assignee: TDK Corporation, Tokyo (JP)

( * ) Notice: Subject to any disclaimer, the term of this patent is extended or adjusted under 35 U.S.C. 154(b) by 693 days.

(21) Appl. No.: 11/387,858

(22) Filed: Mar. 24, 2006

(65) Prior Publication Data

US 2006/0219364 A1  Oct. 5, 2006

(30) Foreign Application Priority Data

Mar. 30, 2005  (JP)  ............... 2005-098074

(51) Int. Cl.
  B32B 37/10 (2006.01)
  B32B 37/00 (2006.01)
  B32B 38/04 (2006.01)
  B44C 1/165 (2006.01)
  B65C 9/18 (2006.01)

(52) U.S. Cl. .............. 156/517; 156/516; 156/513; 156/510; 156/539; 156/540; 156/541; 156/230; 156/252; 156/256; 156/250

(58) Field of Classification Search ............ 156/87, 156/230, 290, 378, 250, 252, 256, 510, 513, 156/517, 539, 540, 541
See application file for complete search history.

(56) References Cited

U.S. PATENT DOCUMENTS 5,505,809 A * 4/1996 Yamamoto et al. .......... 156/264
6,749,417 B2    6/2004 Asakawa et al.
6,758,254 B2 *  7/2004 Moore et al. ................ 156/540
6,797,092 B2    9/2004 Sakamoto et al.
6,800,237 B1   10/2004 Yamamoto et al.
6,824,715 B2   11/2004 Cottier et al.
2005/0000639 A1 * 1/2005 Sasada et al. ............... 156/256

FOREIGN PATENT DOCUMENTS

| CN | 1375842 A | 10/2002 |
|----|-----------|---------|
| JP | A 04-002196 | 1/1992 |
| JP | A-08-162364 | 6/1996 |
| JP | A-9-129502 | 5/1997 |
| JP | A-11-354379 | 12/1999 |
| JP | A-2000-357628 | 12/2000 |
| JP | A-2002-273719 | 9/2002 |
| JP | A 2003-145522 | 5/2003 |
| JP | A-2003-205510 | 7/2003 |
| JP | A-2005-217178 | 8/2005 |
| TW | 419683 B | 1/2001 |

* cited by examiner

Primary Examiner—Mark A Osele
Assistant Examiner—Christopher C Caillouet
(74) Attorney, Agent, or Firm—Oliff & Berridge, PLC

(57) ABSTRACT

In a laminating apparatus for a ceramic green sheet according to the present invention, cutting means and laminating means are positioned on a conveying path of a carrier film conveyed by conveying means. Specifically, cutting of the ceramic green sheet and lamination of sheet pieces are carried out on a single conveying path. Consequently, the reduction of production efficiency is prevented significantly. Furthermore, the position of the cutting means and the position of the laminating means are different. Therefore, even when cut scraps are generated when the ceramic green sheet is cut by the cutting means, the cut scraps are significantly prevented from entering between layers in a green sheet laminated body.

8 Claims, 15 Drawing Sheets

Fig.6
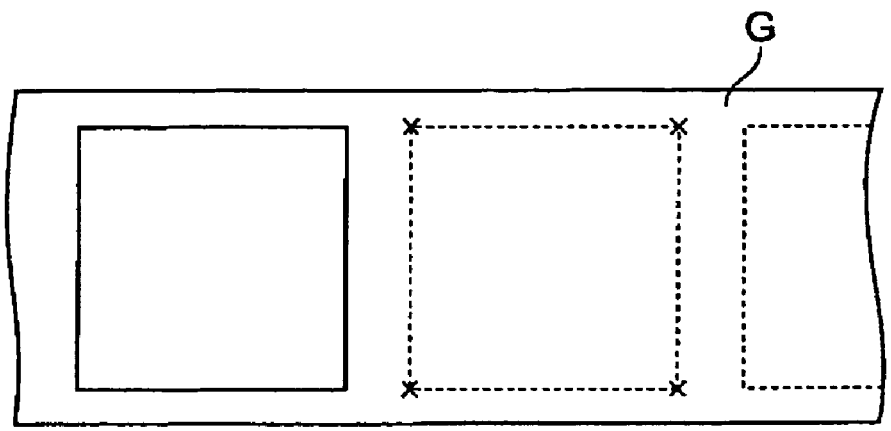
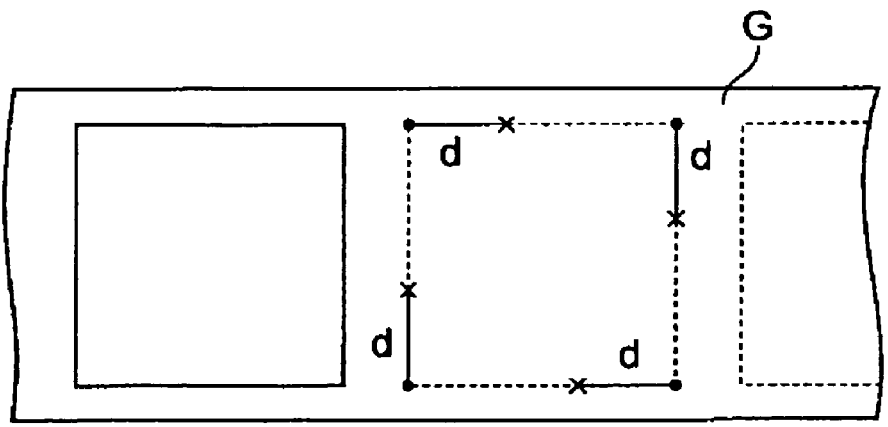
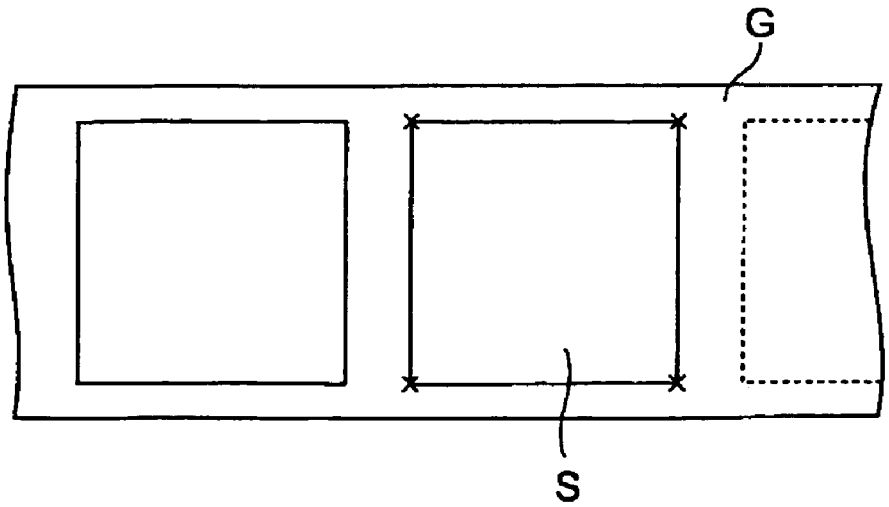

LAMINATING APPARATUS FOR CERAMIC GREEN SHEET AND LAMINATING METHOD FOR SAME

BACKGROUND OF THE INVENTION

1. Field of the Invention

The present invention relates to a laminating apparatus for a ceramic green sheet used when making laminated electronic components such as a laminated ceramic capacitor, and a laminating method for such a ceramic green sheet.

2. Description of the Related Art

Conventionally, there has been disclosed in Japanese Patent Application Laid-Open No. 2003-205510 and Japanese Patent Application Laid-Open No. H8-162364 a laminating apparatus for a ceramic green sheet in this technical field.

However, the ceramic green sheet laminating apparatus described above has the following problems to be solved. That is, in the laminating apparatus according to Japanese Patent Application Laid-Open No. 2003-205510 described above, cut pieces of a ceramic green sheet are laminated in succession at a position where the green sheet on a carrier film is cut with a cutter, thus cut scraps generated when cutting the ceramic green sheet enter between the laminated body of the ceramic green sheets. When the cut scraps enter into the green sheet laminated body, characteristic degradation of various electronic components (for example, decrease of the electrostatic capacitance, and the like) obtained by burning the green sheet laminated body, or delamination occurs.

As in the laminating apparatus according to Japanese Patent Application Laid-Open No. H8-162364, by changing the cut position and the lamination position for the ceramic green sheet, it is possible to prevent cut scraps from being mixed into the ceramic green sheet laminated body. However, ceramic green sheets generally have a thickness of micron order, thus, when absorbing to convey the ceramic green sheet from the cut position thereof to the lamination position, the ceramic green sheet is transformed and/or broken. In addition, the conveying path for the ceramic green sheet is divided into a cut unit in which exists the cut position and a lamination unit in which exists the lamination position, thus adjustment of the positions before and after the conveying processing is complicated, resulting in the reduction of production efficiency.

The present invention is, therefore, contrived in order to solve the abovementioned problems, and an object thereof is to provide a laminating apparatus and lamination method for a ceramic green sheet, which can prevent cut scraps from being mixed into a ceramic green sheet laminated body, without reducing production efficiency.

SUMMARY OF THE INVENTION

The laminating apparatus for a ceramic green sheet according to the present invention comprises: conveying means for conveying a carrier film which holds a ceramic green sheet; cutting means for cutting the ceramic green sheet to obtain a sheet piece of a predetermined shape from the ceramic green sheet, the cutting means being positioned on a conveying path on which the carrier film is conveyed by the conveying means; laminating means for laminating the sheet piece, which is cut by the cutting means, on a lamination-subjected body together with the carrier film, the laminating means being positioned downstream from the cutting means on the conveying path; and release means for releasing the sheet piece from the carrier film.

In this laminating apparatus for a ceramic green sheet, the cutting means and the laminating means are positioned on the conveying path in which the carrier film is conveyed by the conveying means. Specifically, cutting of a ceramic green sheet and lamination of a sheet piece are carried out on a single conveying path. Consequently, the reduction of production efficiency is prevented significantly. Furthermore, the laminating means is positioned downstream from the cutting means on the conveying path, thus the positions of the cutting means and the position of the laminating means are different. Therefore, even when cut scraps are generated when the ceramic green sheet is cut by the cutting means, the cut scraps are significantly prevented from entering between layers in the green sheet laminated body.

A position adjustment mark is provided on at least either the ceramic green sheet or the carrier film. At least either the cutting means or the laminating means preferably comprises mark sensing means for using the position adjustment mark to sense a prescribed position of the ceramic green sheet, and position adjustment means for performing position adjustment on the basis of the prescribed position sensed by the mark sensing means. In this case, position adjustment of the cutting position by means of the cutting means and position adjustment of the lamination position by means of the laminating means are realized automatically.

The release means preferably releases the sheet piece from the carrier film by moving the carrier film and the lamination-subjected body relatively so that the carrier film and the lamination-subjected body are separated from each other.

The laminating method for a ceramic green sheet according to the present invention comprises the steps of: cutting the ceramic green sheet to obtain a sheet piece of a predetermined shape from the ceramic green sheet by means of cutting means which is positioned on a conveying path of a carrier film holding the ceramic green sheet conveyed by conveying means; laminating the sheet piece which is cut by the cutting means on a lamination-subjected body together with the carrier film, by means of the laminating means which is positioned downstream from the cutting means on the conveying path; and releasing the sheet piece from the carrier film by means of the release means.

In this laminating method for a ceramic green sheet, the cutting means and the laminating means are positioned on the conveying path in which the carrier film is conveyed by the conveying means. Specifically, cutting of a ceramic green sheet and lamination of a sheet piece are carried out on a single conveying path. Consequently, the reduction of production efficiency is prevented significantly. Furthermore, the laminating means is positioned downstream from the cutting means on the conveying path, thus the positions of the cutting means and the position of the laminating means are different Therefore, even when cut scraps are generated when the ceramic green sheet is cut by the cutting means, the cut scraps are significantly prevented from entering between layers in the green sheet laminated body.

A position adjustment mark is provided on at least either the ceramic green sheet or the carrier film. At least either before obtaining the sheet piece by means of the cutting means or before laminating the sheet piece on the lamination-subjected body by means of the laminating means, there are preferably provided a step of sensing a prescribed position of the ceramic green sheet using the position adjustment mark by means of mark sensing means, and a step of adjusting the positions using position adjustment means, on the basis of the prescribed position sensed by the mark sensing means. In this case, position adjustment of the cutting position by means of the cutting means and position adjustment of the lamination position by means of the laminating means are realized automatically.

Further, when releasing the sheet pieces from the carrier film, the release means preferably releases the sheet piece from the carrier film by moving the carrier film and the lamination-subjected body relatively so that the carrier film and the lamination-subjected body are separated from each other.

The present invention provides a laminating apparatus and lamination method for a ceramic green sheet, which can prevent cut scraps from being mixed into a ceramic green sheet laminated body, without reducing production efficiency.

BRIEF DESCRIPTION OF THE DRAWINGS

FIG. 6 is a figure showing a cutting procedure for cutting the sheet pieces using the cutting means;

DESCRIPTION OF THE PREFERRED EMBODIMENTS

Figure 1:
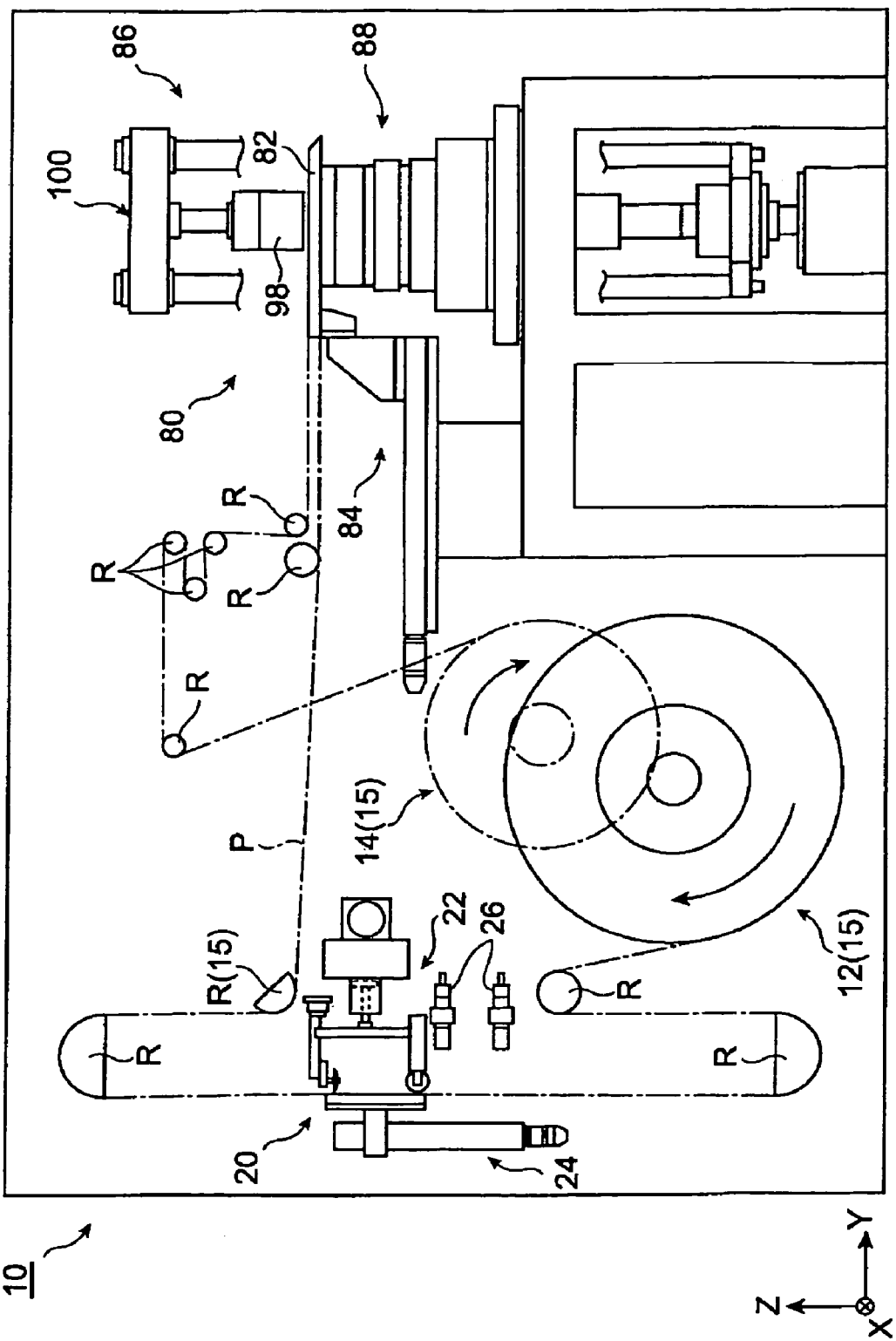
FIG. 1 is a schematic configuration diagram showing an apparatus according to an embodiment of the present invention.

Hereinafter, embodiments considered the best for implementing the present invention are described in detail with reference to the attached drawings. It should be noted that like reference characters are used to indicate the same or like elements, thus the overlapping explanations are omitted accordingly.

First of all, a laminating apparatus (cutting apparatus) 10 for a ceramic green sheet (also referred to simply as "green sheet" hereinafter) according to the embodiments of the present invention is described with reference to FIG. 1. FIG. 1 is a schematic configuration diagram of the laminating apparatus 10.

As shown in FIG. 1, the laminating apparatus 10 comprises a feed roller 12 around which is wound a carrier film F which holds a green sheet G, a plurality of guiding portions R which guide the carrier film F, which is fed by the feed roller 12, onto a predetermined conveying path P, and a take-up roller 14 for winding the carrier film F guided on the conveying path P. Specifically, in the laminating apparatus 10 the feed roller 12, plurality of guiding portions R, and take-up roller 14 configure conveying means 15 for the carrier film F, wherein the carrier film F is fed from the feed roller 12, guided on the conveying path P by the guiding portions R, and then wound around the take-up roller 14.

Moreover, this cutting apparatus 10 further comprises cutting means 20 provided on the conveying path P of the carrier film F, and laminating means 80 provided downstream from the cutting means 20 on the conveying path P.

The cutting means 20 is a portion for cutting the green sheet G into square-shaped sheet pieces S (for example, 160 mm×160 mm), and dividing after-mentioned conductive patterns C formed on the green sheet G for each unit Hereinafter, the configuration of the cutting means 20 is described with reference to FIG. 2 through FIG. 4.

The cutting means 20 comprises a cutter unit 22 for cutting the green sheet G, a slide table 24 for adhering and holding the carrier film F, and four cameras (mark sensing means) 26 for sensing an after-mentioned mark (position adjustment mark) M provided on the green sheet G.

Figure 2:
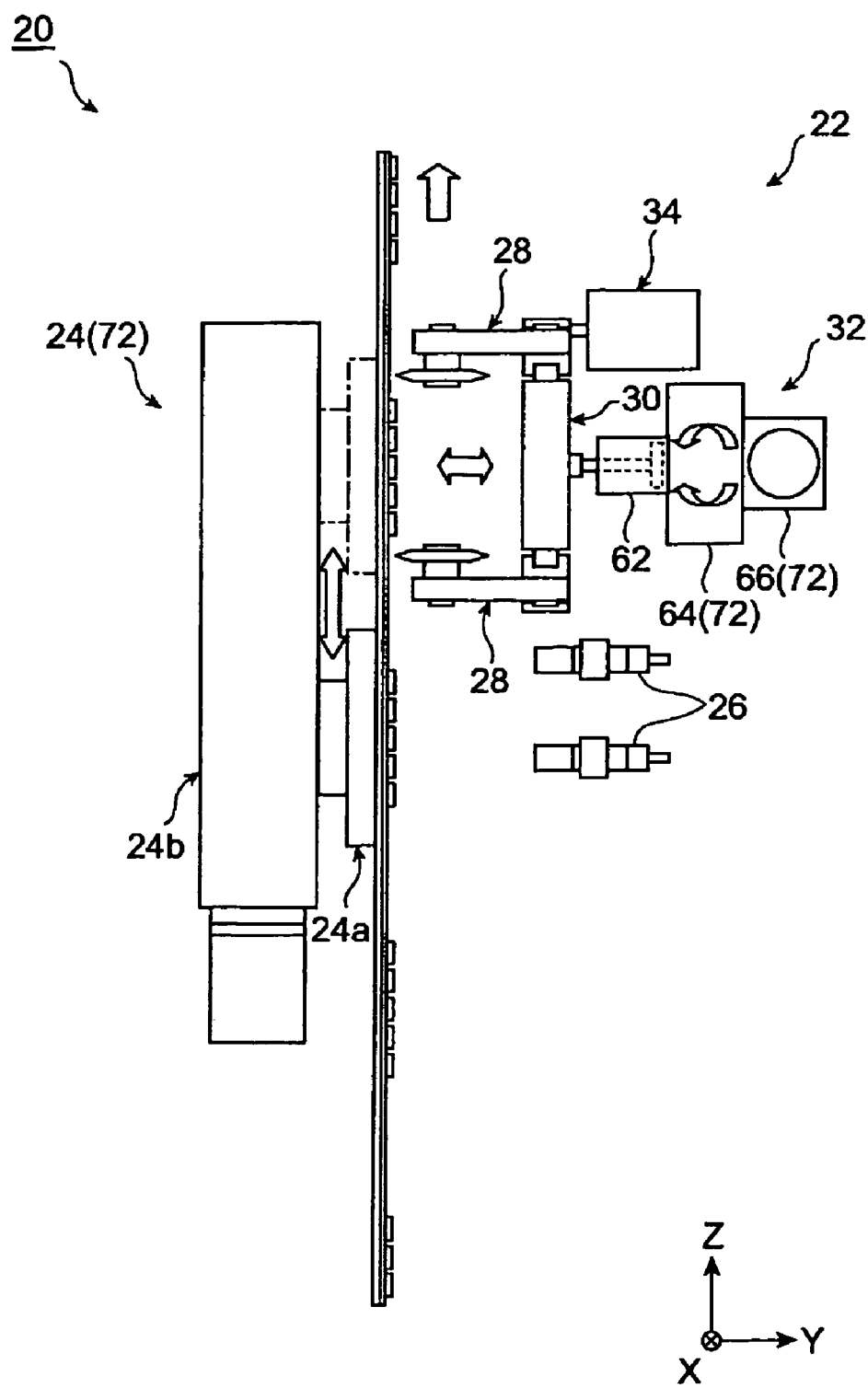
FIG. 2 is an enlarged view showing a substantial part of the cutting means of FIG. 1.

The slide table 24 comprises a adhesive table 24a for adhering and holding the carrier film F from a surface thereof on the back of the principal surface, and a vertical drive portion 24b for driving the adhesive table 24a in a vertical direction (Z direction in FIG. 2). It should be noted that a known actuator is employed as the vertical drive portion 24b. The carrier film F brought into the cutting means 20 is conveyed facing straight upward in a state in which the carrier film F is adhered to the adhesive table 24a of the slide table 24 so that the side facing the cutter unit 22 becomes the principal surface of the carrier film F (green sheet G forming face), and the green sheet G of the carrier film F is cut by the cutter unit 22 while the carrier film F is being adhered to the adhesive table 24a.

The cutter unit 22 comprises four arm portions 28 extending in a normal direction (thickness direction) of the carrier film F facing straight upward and brought into the cutting means 20, an arm hold portion 30 for holding these four arm portions 28, a position adjustment portion 32 for holding the arm hold portion 30 and performing position adjustment, and moving means 34 for moving the four arm portions 28.

Figure 3:
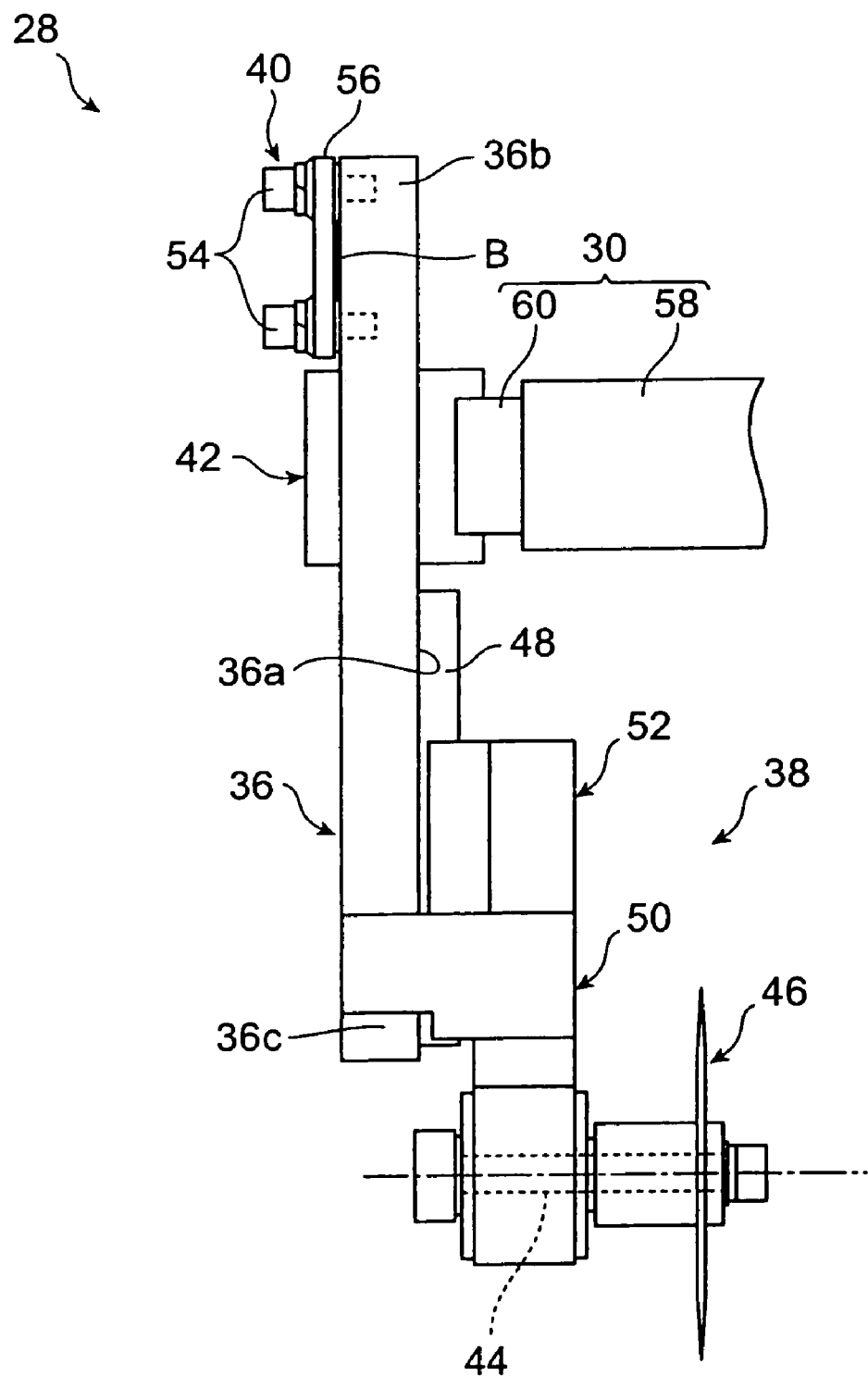
FIG. 3 is an enlarged view showing a substantial part of an arm portion of FIG. 2.

Each of the arm portions 28 comprises, as shown in FIG. 3, a long arm 36, a cutter portion 38 provided in one end portion 36c of the arm 36, a belt picking portion 40 provided in other end portion 36b of the arm 36, and a guiding portion 42 provided in the vicinity of the center of the arm 36.

The cutter portion 38 comprises a roller cutter 46 with a round blade, which has a rotating axis 44 extending in a direction perpendicular to a longitudinal direction of the arm 36, a pivotally supporting member 50 which pivotally supports the roller cutter 46 in a freely rotating fashion and is at the same time guided in the longitudinal direction of the arm 36 along an elevator rail 48 provided on a side face 36a of the arm 36, and a compression spring (pressing force adjustment means) 52 for biasing the pivotally supporting member 50 in a direction away from the arm 36.

Since the cutter portion 38 has such a configuration described above, when the cutter portion 38 of the arm 36 is brought closer to the carrier film F and the roller cutter 46 is pressed against the carrier film F, the roller cutter 46 can rotate on the carrier film F. Moreover, the pressing force of the roller cutter 46 against the carrier film F is adjusted by the spring 52.

The belt picking portion 40 is a portion for picking an after-mentioned timing belt B perpendicular to the arm 36, between the arm 36 and this portion, wherein the timing belt B is fixed to the arm portions 28 by means of two bolts 54 and a belt retaining member 56.

The guiding portion 42 is a portion for coupling the arm hold portion 30 and the arm portion 28. The arm hold portion 30 comprises a plate 58 in the form of a square flat plate, which faces the carrier film F conveyed to the cutting means 20, and four rails 60 provided on an end face of the plate 58. Each of the arm portions 28 extending in the thickness direction of the plate 58 is attached to each of the rails 60 at the guiding portion 42 such that the extension direction of the rail 60 runs at right angle with the axis line of the rotating axis 44 of the roller cutter 46 (see the dashed line in FIG. 3). The attached arm portions 28 in the guiding portion 42 are guided to the rails 60 and slidable in the extension direction of the rails 60.

Specifically, the moving direction of the arm portion 28 (extension direction of the rail 60) and the axis line direction of the rotating axis 44 of the roller cutter 46 (direction perpendicular to the extension direction of the rails 60) run at the right angles with each other. Therefore, when the arm portion 28 moves along the rail 60 in a state in which the roller cutter 46 is pressed against the green sheet G on the carrier film F, the roller cutter 46 is rotated by friction produced between the roller cutter 46 and the green sheet G and cuts the green sheet G while proceeding in the moving direction of the arm portion 28.

The position adjustment portion 32 which holds the arm hold portion 30 comprises a first position adjustment portion 62 capable of adjusting the position of the arm hold portion 30 in a direction of movement with respect to the carrier film F (Y direction in FIG. 3), a second position adjustment portion 64 capable of adjusting the position of the arm hold portion 30 in the normal line of a center position 58a of the plate 58 (around Y axis in FIG. 3), and a third position adjustment portion 66 capable of adjusting the position of the arm hold portion 30 in the width direction of the carrier film F that the plate 58 faces (X direction in FIG. 3). Specifically, the position adjustment portion 32 can adjust the position of the arm hold portion 30 in a direction of movement with respect to the carrier film F (facing direction) by means of the first position adjustment portion 62, and also can adjust the position of the arm hold portion 30 in a surface direction of the carrier film F (i.e. X-Z flat surface direction) by means of the second position adjustment portion 64 and the third position adjustment portion 66.

Figure 4:
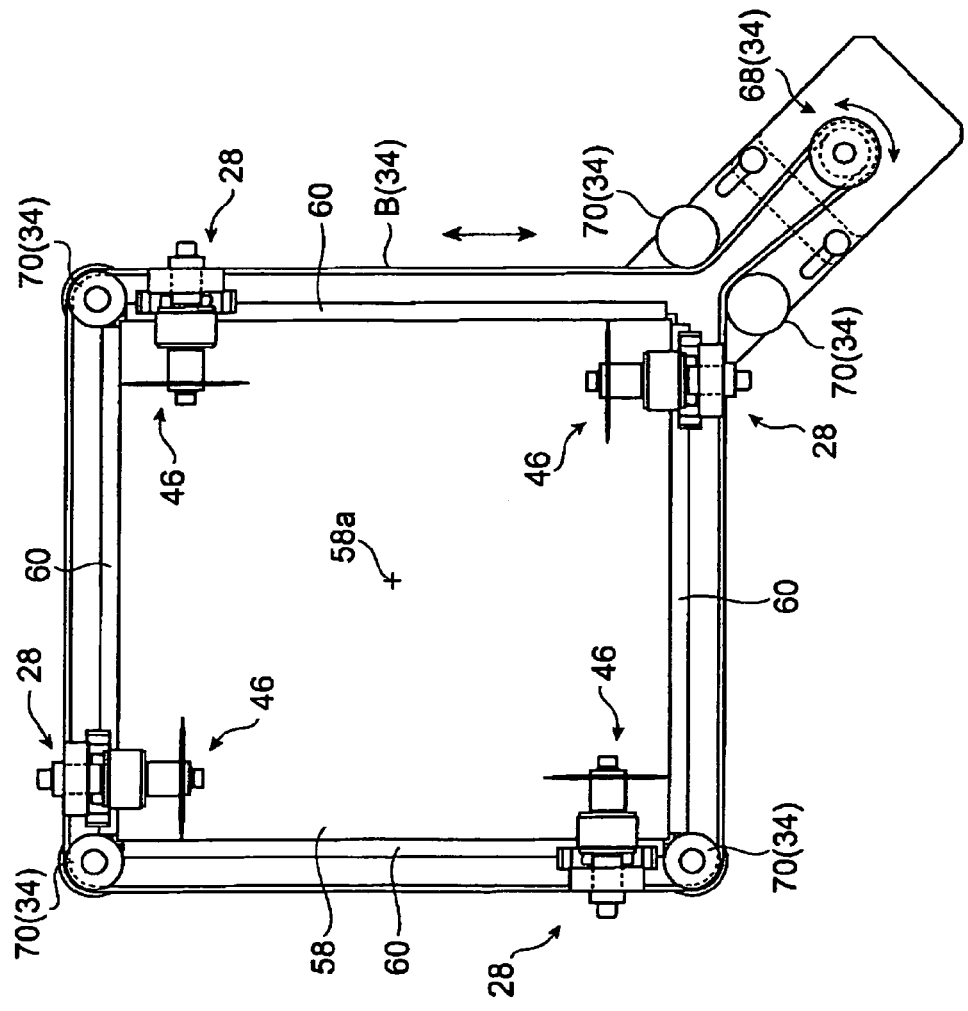
FIG. 4 is a bottom view showing the cutting means of FIG. 2.
Figure 5:
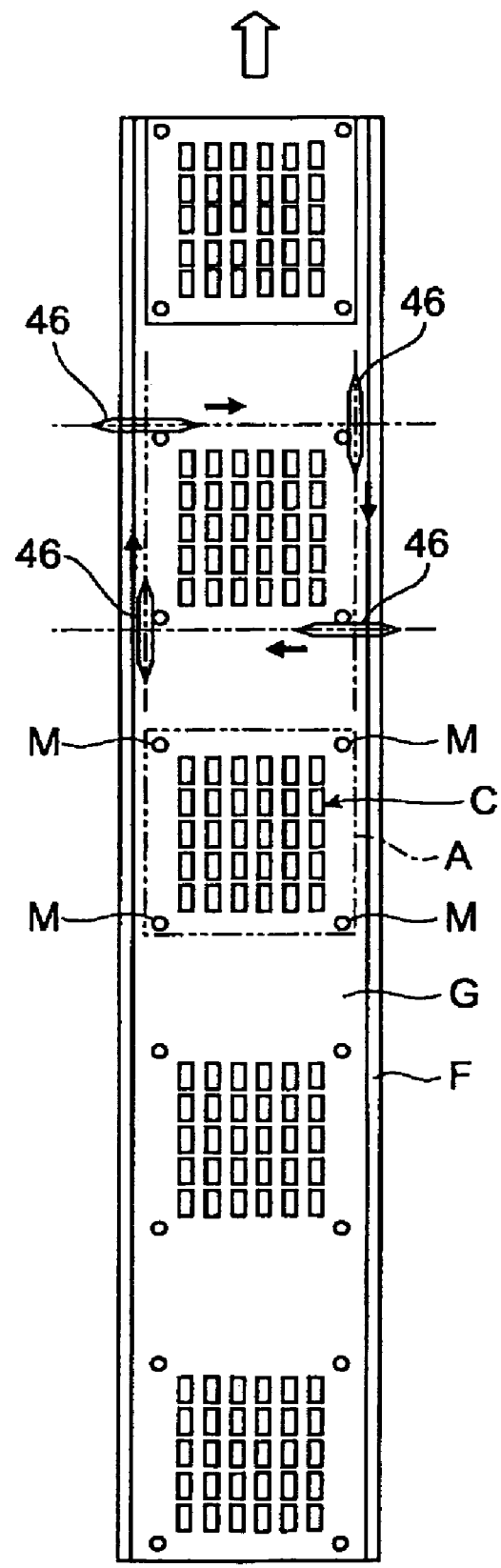
FIG. 5 is a figure showing a state in which a carrier film is conveyed to the cutting means of FIG. 2.

The moving means 34 comprises, as shown in FIG. 4, the timing belt B, a motor 68 for driving the timing belt B, and a pulley 70 for guiding the timing belt B, which is driven by the motor 68, along an edge of the plate 58 of the arm hold portion 30.

The abovementioned four arm portions 28 are fixed to the timing belt B at the belt picking portion 40. Therefore, the motor 68 is rotated normally or inversely and caused to drive the timing belt B, which causes the four arm portions 28 to move simultaneously along the rails 60 of the arm hold portion 30. At this moment, the roller cutters 46 move simultaneously so as to obtain a square trajectory. It should be noted that, as shown in FIG. 4, a space of approximately the same length as an edge of the plate 58 is provided between the arm portions 28, which are adjacent to each other along the timing belt B, such that each of the arm portions 28 is disposed on the same position on the corresponding edge of the plate 58. Therefore, even when the four arm portions 28 are moved simultaneously by the timing belt B, a situation in which the arm portions 28 contact with each other can be prevented significantly.

Here, the carrier film F which is sent to the cutting means 20 is configured with PET, and the principal surface thereof holds the green sheet G. The conductive patterns C and a mark M composed of the same metallic material (for example, copper) are formed on the green sheet G. One unit of the conductive patterns C are composed of thirty rectangular patterns, and these patterns are disposed in a matrix so that a unit region A is formed into a rough square shape. The simultaneous movement of the arm portions 28 causes the conductive patterns C to be cut for each unit along the contour of the unit region A, whereby a square sheet piece S is cut out from the green sheet C. It should be noted that the mark M is formed in the vicinity of each corner on each unit region A having the conductive patterns C. A plurality of such units with the conductive patterns C are formed in succession on the green sheet G, with a prescribed separation therebetween.

The upstream on the conveying path P of the cutter unit 22 is provided with the four cameras 26, and the position of the mark M is sensed by these four cameras 26. The slide table 24 and the second position adjustment portion 64 and third position adjustment portion 66 of the arm hold portion 30 are driven by an unshown control portion on the basis of the position of the mark M which is sensed by the cameras 26, and the cut position of the roller cutter 46 can be adjusted. Specifically, position adjustment means 72 of the roller cutter 46 according to the present invention is configured with the slide table 24 and the second position adjustment portion 64 and third position adjustment portion 66 of the arm hold portion 30.

When the sheet piece S is cut out from the green sheet G by means of the above-described cutting means 20, first of all the carrier film F which is conveyed to the cutting means 20 is adhered to and held by the adhesive table 24a of the slide table 24. Sensing the unit region (i.e. cut region) A having the conductive patterns C is carried out on the adhered and held carrier film F by the camera 26 using the mark M. At this moment, when serpentine movement or the like of the carrier film F causes positional displacement, the position adjustment means 72 of the roller cutter 46 is used to perform adjustment (correction) of the cut position. Then, the carrier film F is conveyed to the position so as to be opposed to the cutter unit 22, by means of the vertical drive portion 24b of the slide table 24, and the processing of cutting the sheet piece S from the green sheet G is carried out.

In this cutting processing, first of all the arm hold portion 30 is brought closer to the carrier film F side by the first position adjustment portion, and the roller cutter 46 is cause to abut on the green sheet G. At this moment, as shown in FIG. 6, the position of the roller cutter 46 at an angle (starting position) of the cut region A (position of X shown in FIG. 6A). When the timing belt B is driven by rotating the motor 68 of the moving means 34, the four roller cutters 46 move at the same speed while keeping the travel distance d constant (see FIG. 6B). When each of the roller cutters 46 reaches an angle (end position) of the cut region, the rotation of the motor 68 is stopped, and the movement of the roller cutters 46 is stopped (see FIG. 6C). Accordingly, the square sheet piece S is cut out such that the conductive patterns C are divided for each unit from the green sheet G. It should be noted that normal rotation and inverse rotation of the motor 68 may be repeated to move the roller cutters 46 numbers of times from the starting position to the end position, according to need.

In the apparatus 10 with the above-described cutting means 20, all edges of the sheet piece S (i.e. four edges) are cut by the roller cutters 46, a cutting failure on the green sheet G is significantly prevented, compared to the conventional apparatus which performs cutting of the green sheet G by using blade cutters. Moreover, each of the edges of the sheet piece S is cut without changing the position of the cutters, thus improvement of cutting dimensional accuracy is realized, compared to the conventional apparatus in which the position of the cutter is changed when cutting each edge. Furthermore, the four roller cutters 46 are moved simultaneously by means of the timing belt B, thus reduction of time for cutting the sheet piece S is achieved, compared to the case in which each of the roller cutters 46 is moved in rotation.

After the cut position is sensed by the cameras 26 using the mark M provided on the green sheet G, the relative position of the carrier film F and roller cutter 46 is adjusted automatically by the position adjustment means 72 on the basis of the cut position. Further, by employing the compression spring 52 provided in the cutter portion 38 of the arm portion 28, the pressure from the compression spring 52 of the arm portion 28 is adjusted even if one or plurality of arm portions 28 needlessly approach the carrier film F, thus a problem that the carrier film F is cut by the roller cutters 46 can be avoided.

Although the sheet piece S is in the form of a square shape, it may be changed to other polygonal shapes (for example, hexagonal shape) according to need. In this case, the roller cutters 46 are prepared as many as the number of the edges of the polygon.

Figure 7:
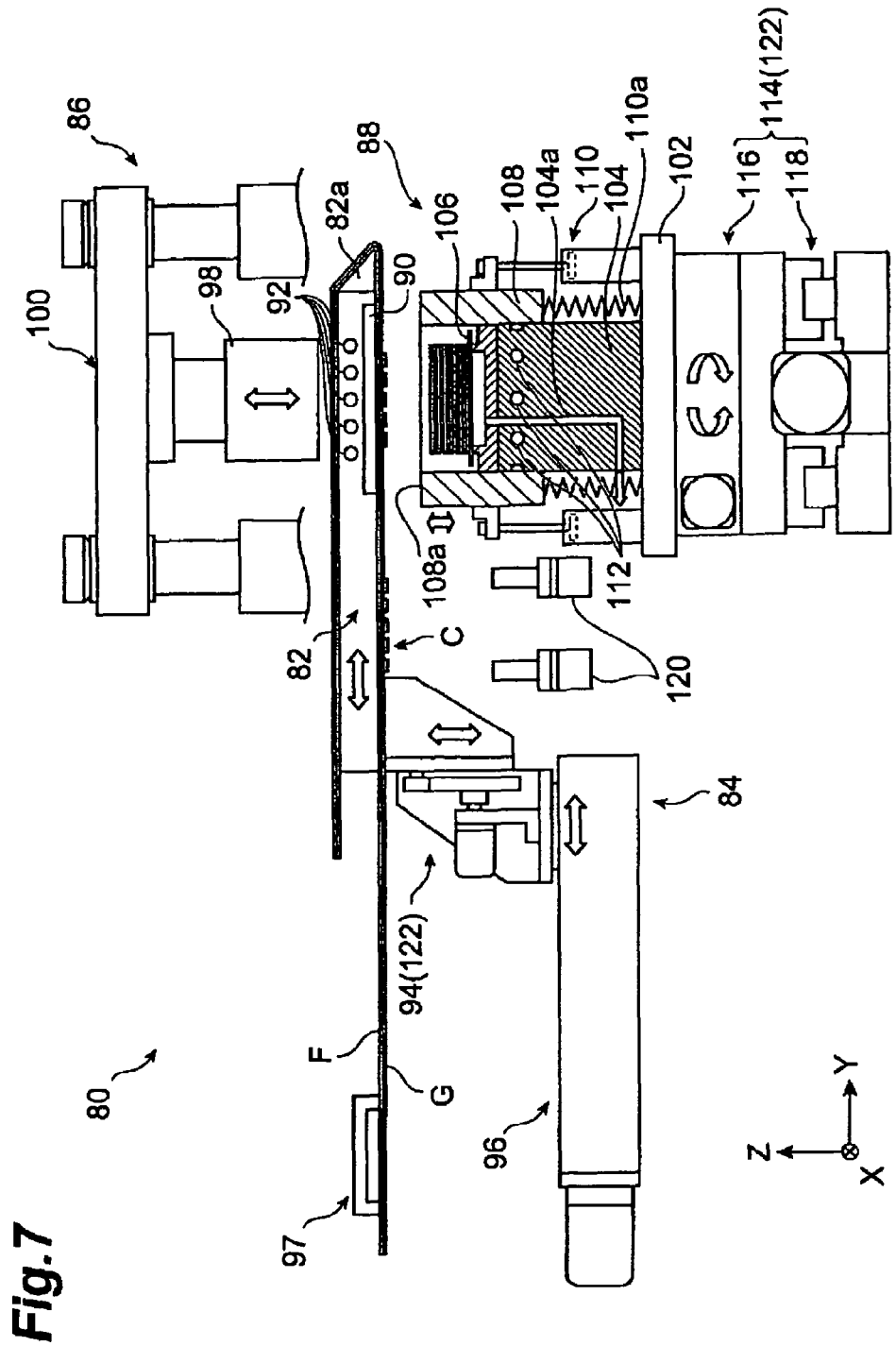
FIG. 7 is an enlarged view showing a substantial part of the laminating means of FIG. 1.

Next, the laminating means 80 provided downstream from the cutting means 20 on the conveying path P is described with reference to FIG. 7.

The laminating means 80 comprises a film conveying portion 84 for controlling the position of a conveying plate 82 which conveys the carrier film F conveyed to the laminating means 80, a press portion 86 for pressing the conveying plate 82, and a laminating portion 88 for laminating the sheet pieces S in succession on the carrier film F which is cut from the green sheet G by the cutting means 20. It should be noted that, as shown in FIG. 7, the conveying path P of the carrier film F follows a horizontal direction (Y direction in FIG. 7) in the vicinity of the laminating means 80, and the carrier film F is conveyed to the cutting means 20 such that the principal surface of the carrier film F faces vertically downward.

The conveying plate 82 is a plate-like member held horizontally. The carrier film F is conveyed by sliding the carrier film F along the top and bottom faces of the conveying plate 82. The conveying plate 82 is embedded with a film adhering portion 90 for adhering and holding the carrier film F which is positioned on the bottom surface of the conveying plate 82, and a heater 92 for heating the carrier film F held by the film adhering portion 90. Of the end portions of the conveying plate 82, an end portion 82a, which is passed by the carrier film F, is sharpened so that the carrier film F can easily come around from the bottom surface to the top surface. The press portion 86 and the laminating portion 88 are arranged vertically so as to be opposed to each other via the conveying plate 82.

The film conveying portion 84 is configured with the abovementioned conveying plate 82, a vertical drive portion 94 capable of supporting the conveying plate 82 from below and driving the conveying plate 82 in a vertical direction (Z direction in FIG. 7), and a horizontal drive portion 96 capable of driving the conveying plate 82 in a horizontal direction (Y direction in FIG. 7) via the vertical drive portion 94. Therefore, the film conveying portion 84 can proceed by means of drive of the horizontal drive portion 96 such that the conveying plate 82 is allowed to lie between the press portion 86 and the laminating portion 88. Further, the film conveying plate 84 can vertically move the conveying plate 82, which lies between the press portion 86 and the laminating portion 88, by means of drive of the vertical drive portion 94. It should be noted that a known actuator is employed as the vertical drive portion 94 and the horizontal drive portion 96. The upstream of the laminating means 80 on the conveying path P is provided with a film fixing portion 97 for stopping the conveyance of the carrier film F.

The press portion 86 disposed at the upper part of the conveying plate 82 is configured with a punch 98 for pressing the conveying plate 82, and a punch drive portion 100 for vertically moving the punch 98 while holding it.

The laminating portion 88 disposed at the lower part of the conveying plate 82 comprises a supporting table 102 extending in a horizontal direction, a square holder 106 which is supported by a stand 104 mounted on the supporting table 102 and on which the sheet pieces S of the carrier film F are laminated in succession, a square cylindrical frame 108 extending in a vertical direction so as to surround the stand 104 and the holder 106, and a frame drive portion 110 which is disposed on the supporting table 102 and moves the frame 108 vertically.

The frame 108 is lifted up by the frame drive portion 110, and an upper end surface 108a of the frame 108 is caused to abut on the carrier film F, whereby the frame 108 accommodating the holder 106 therein can be kept airtight It should be noted that the frame drive portion 110 comprises biasing means 110a (for example, a compression spring) so that the fame 108 can be shifted, even in a sate in which the frame 108 is caused to abut on the carrier film F. The stand 104 is embedded with a heater 112 for heating the holder 106, and is also provided with a suction hole 104a for vacuum-suctioning the inside of the frame 108.

Moreover, the laminating portion 88 has, under the supporting table 102, a position adjustment portion 114 for adjusting the position of the holder 106 via the supporting table 102, and this position adjustment portion 114 is configured with a first position adjustment portion 116 and a second position adjustment portion 118. The first position adjustment portion 116 has a mechanism capable of adjusting the position of the supporting table 102 around a vertical axis which passes through a center position of the holder 106, and the second position adjustment portion 118 has a mechanism capable of adjusting the position of the supporting table 102 in the width direction (X direction in FIG. 7) of the carrier film F which the holder 106 faces (so-called "tilt mechanism"). Specifically, the relative position of the holder 106 with respect to the carrier film F can be adjusted by the position adjustment portion 114.

It should be noted that the upstream of the laminating portion 88 on the conveying path P is provided with four cameras 120 (mark sensing means), and the position of the mark M provided on the carrier film F is sensed by the four cameras 120, as in the case of the abovementioned cameras 26. The horizontal drive portion 96 of the film conveying portion 84 and the position adjustment portion 114 of the laminating portion 88 are driven by an unshown control portion on the basis of the position of the mark M which is sensed by the cameras 120, and the relative position of the carrier film F and holder 106 is adjusted. Specifically, position adjustment means 122 of the holder 106 according to the present invention is configured with the film conveying portion 84 and the position adjustment portion 114 of the laminating portion 88.

Next, a sequence of laminating the sheet pieces S on the carrier film F onto the holder 106 by means of the laminating means 80 is described with reference to FIG. 8 through FIG.

15. It should be noted that the following description describes the sequence in which new sheet pieces S are laminated on the holder 106 on which a laminated body 130 having a plurality of sheet pieces S is formed.

Figure 8:
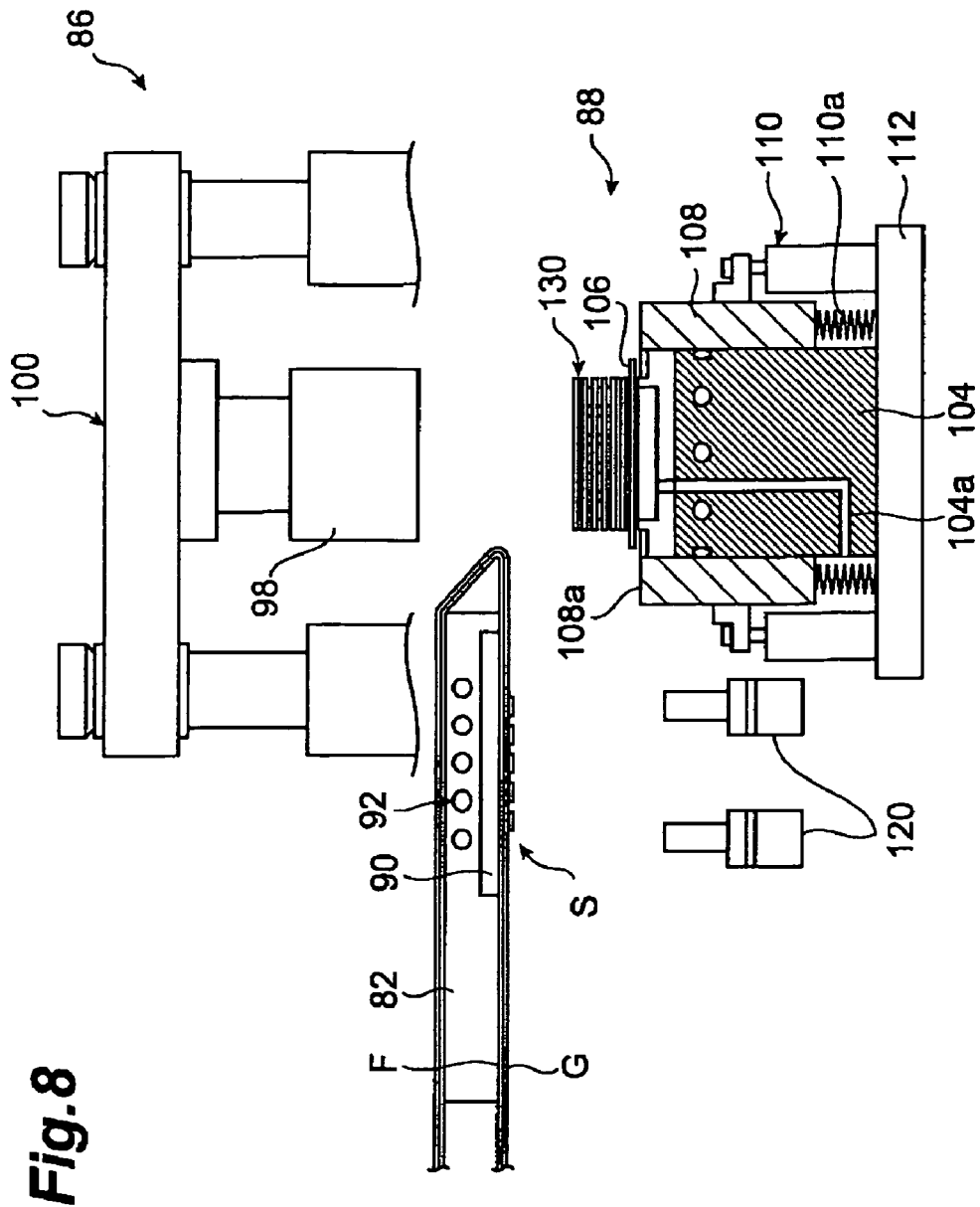
FIG. 8 is a figure showing a process in which the sheet pieces are laminated by using the laminating means of FIG. 7.

First of all, when the sheet piece S portion on the carrier film F, which is cut by the cutting means 20, is conveyed to the film adhering portion 90 of the conveying plate 82, the carrier film F is adhered to and held by the film adhering portion 90, as shown in FIG. 8. Then, the mark M provided on the carrier film F is sensed by the cameras 120 in a state in which the conveying plate 82 adheres and holds the carrier film F. Thereafter, the horizontal drive portion 96 and the position adjustment portion 114 of the laminating portion 88 are driven to perform adjustment of the relative position of the carrier film F and holder 106 (i.e., correction of positional displacement). It should be noted that in this step the frame 108 is in a state of being held on the lower side by the frame drive portion 110, and the holder 106 is in a state of being exposed from the frame 108.

Figure 9:
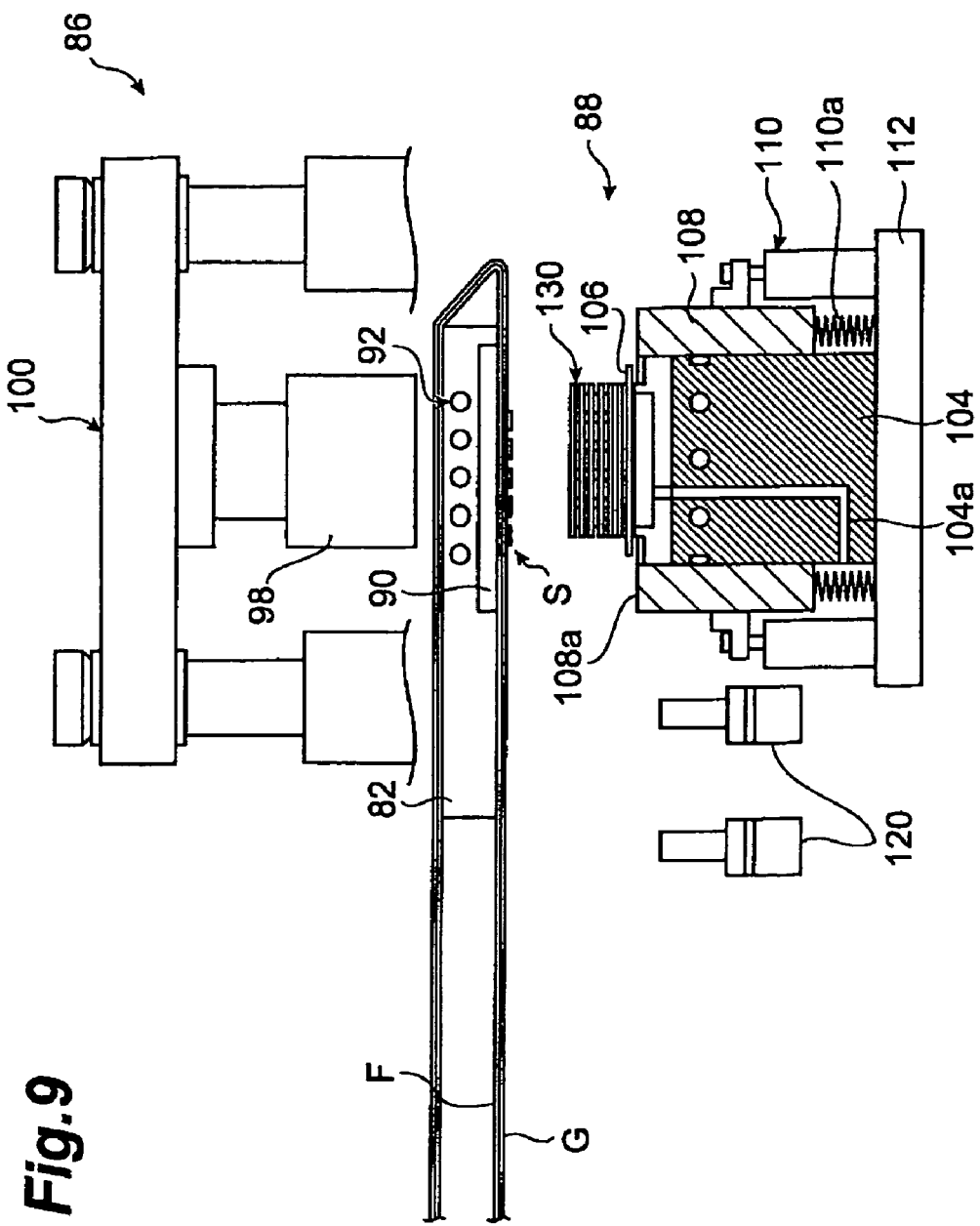
FIG. 9 is a figure showing a process in which the sheet pieces are laminated by using the laminating means of FIG. 7.

Next, as shown in FIG. 9, the conveying plate 82 is moved by the horizontal drive portion 96 so as to lie between the press portion 86 and the laminating portion 88, and the sheet pieces S, which is adhered and held by the conveying plate 82, and the laminated body 130 on the holder 106 are caused to face each other so as to be overlapped in a vertical direction.

Figure 10:
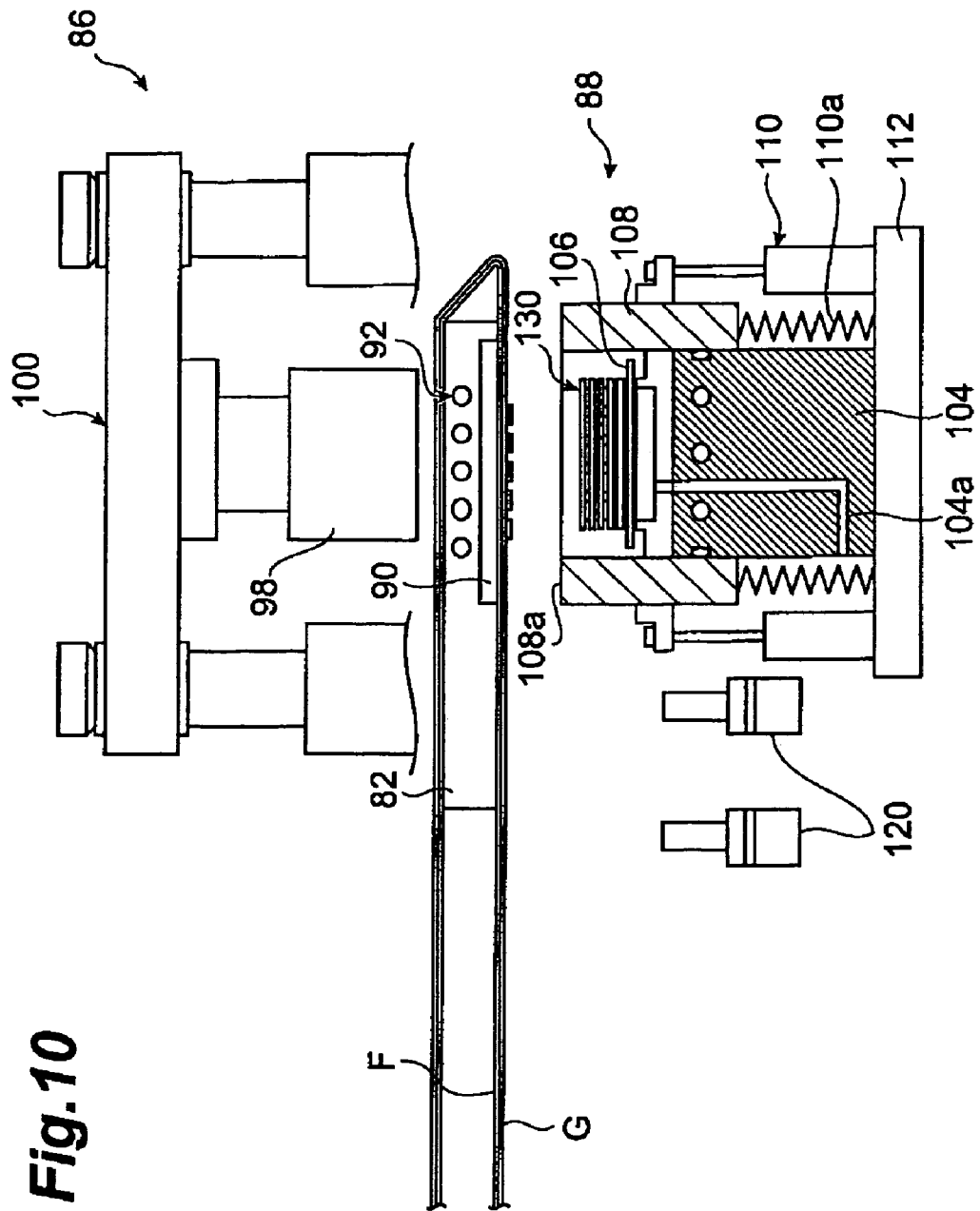
FIG. 10 is a figure showing a process in which the sheet pieces are laminated by using the laminating means of FIG. 7.
Figure 11:
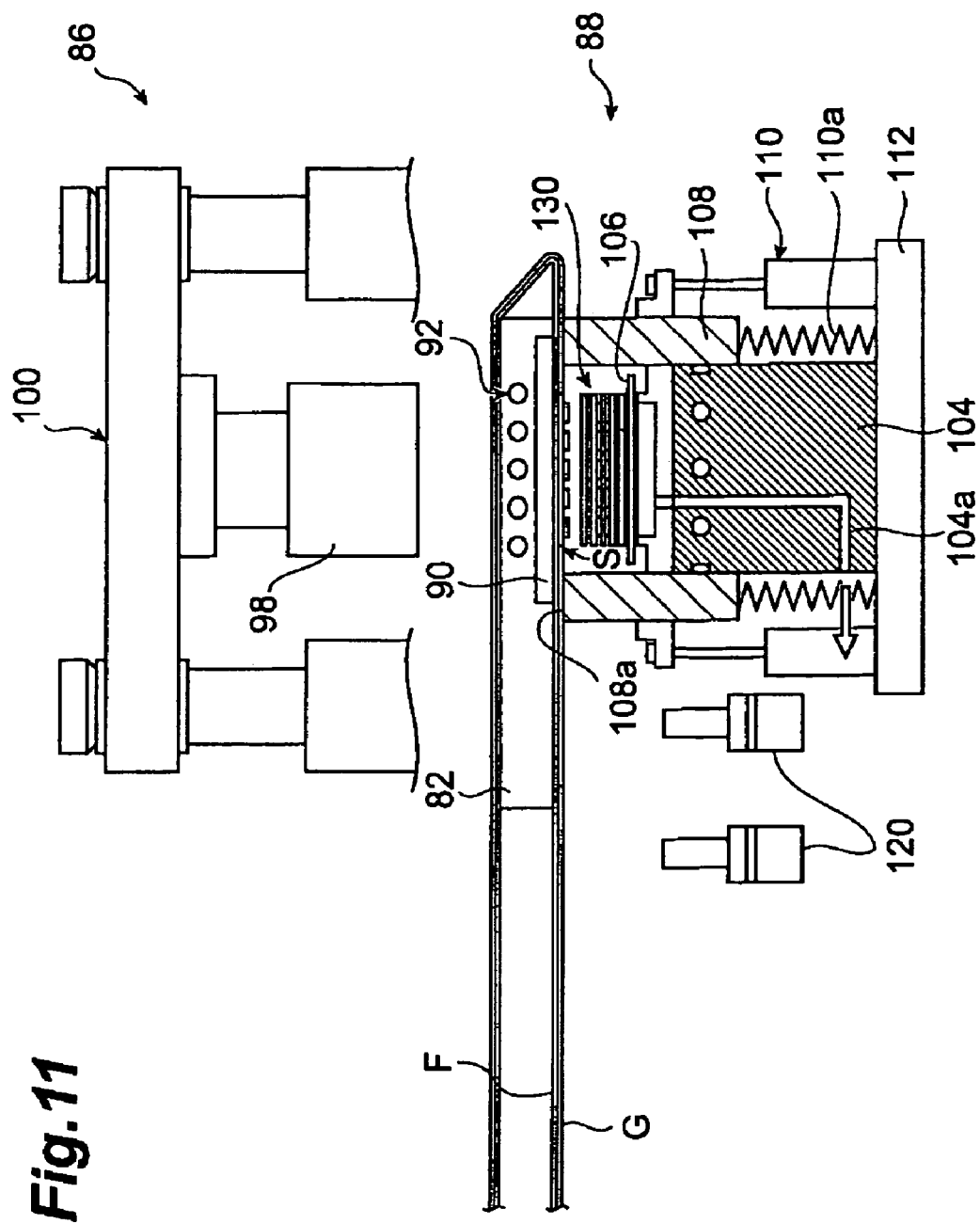
FIG. 11 is a figure showing a process in which the sheet pieces are laminated by using the laminating means of FIG. 7.

The frame 108 is lifted up by the frame drive portion 110 such that the holder 106 is accommodated inside the frame 108, as shown in FIG. 10. Next, as shown in FIG. 11, the conveying plate 82 is lifted down by the vertical drive portion 94 of the film conveying portion 84 to bond the carrier film F to the upper end surface 108a of the frame 108. Specifically, the frame 108 is closed by the conveyed plate 82 and is kept airtight, with the holder 106 accommodated therein. After keeping the frame 108 airtight, an unshown vacuum pump is used to vacuum-suction the inside the frame 108 through the suction hole 104a of the stand 104.

Figure 12:
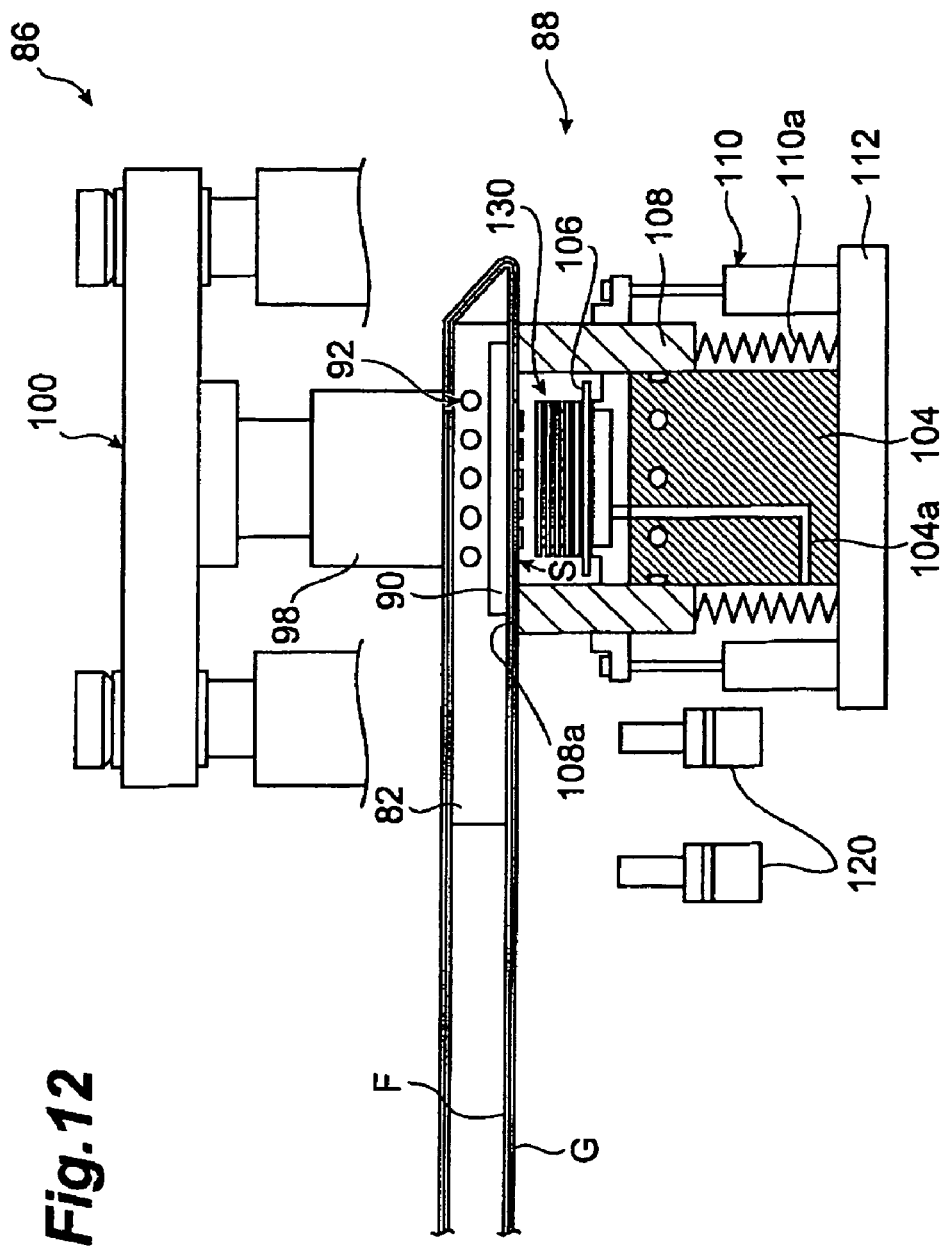
FIG. 12 is a figure showing a process in which the sheet pieces are laminated by using the laminating means of FIG. 7.

In a state in which the frame 108 is subjected to vacuum suctioning, the film adhering portion 90 is heated by the heater 92, the holder 106 is heated by the heater 112, and, as shown in FIG. 12, the punch drive portion 100 is driven to press down the conveying plate 82 with predetermined pressure by means of the punch 98. Accordingly, the sheet piece S adhered to the film adhering portion 90 is thermally bonded onto the laminated body 130. At this moment, since the frame 108 can be lifted down by the biasing means 110a of the frame drive portion 110, a problem that the frame 108 becomes an obstruct in the bonding is avoided.

Figure 13:
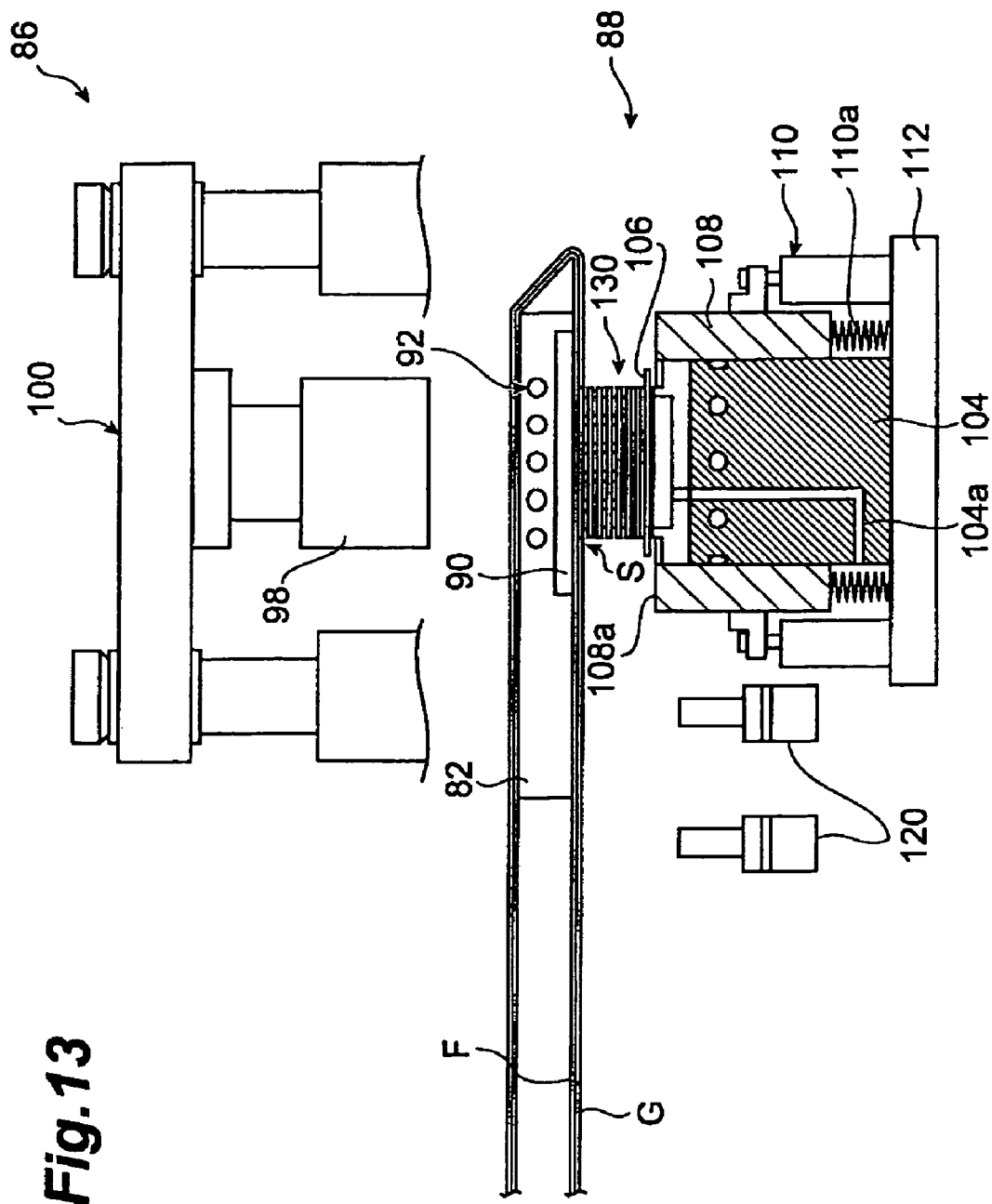
FIG. 13 is a figure showing a process in which the sheet pieces are laminated by using the laminating means of FIG. 7.
Figure 14:
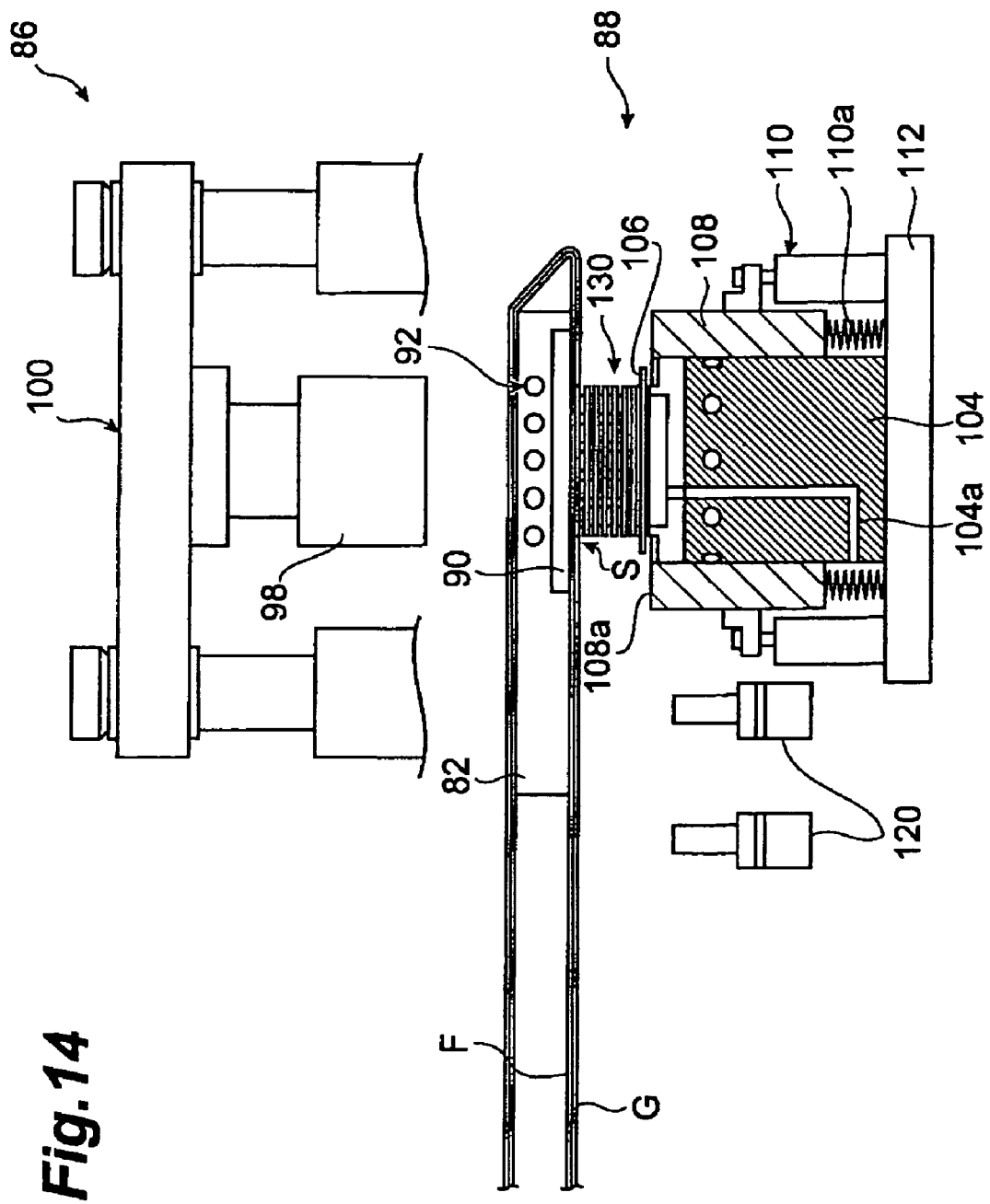
FIG. 14 is a figure showing a process in which the sheet pieces are laminated by using the laminating means of FIG. 7.

Next, an unshown deaeration hole of the frame 108 is used to perform deaeration of the frame 108, and at the same time the frame 108 is lifted down by the frame drive portion 110 until the holder 106 is exposed, as shown in FIG. 13. Furthermore, adhering the carrier film F by means of the film adhering portion 90 is stopped, and at the same time the punch 98 is lifted up by the punch drive portion 100, as shown in FIG. 14.

Figure 15:
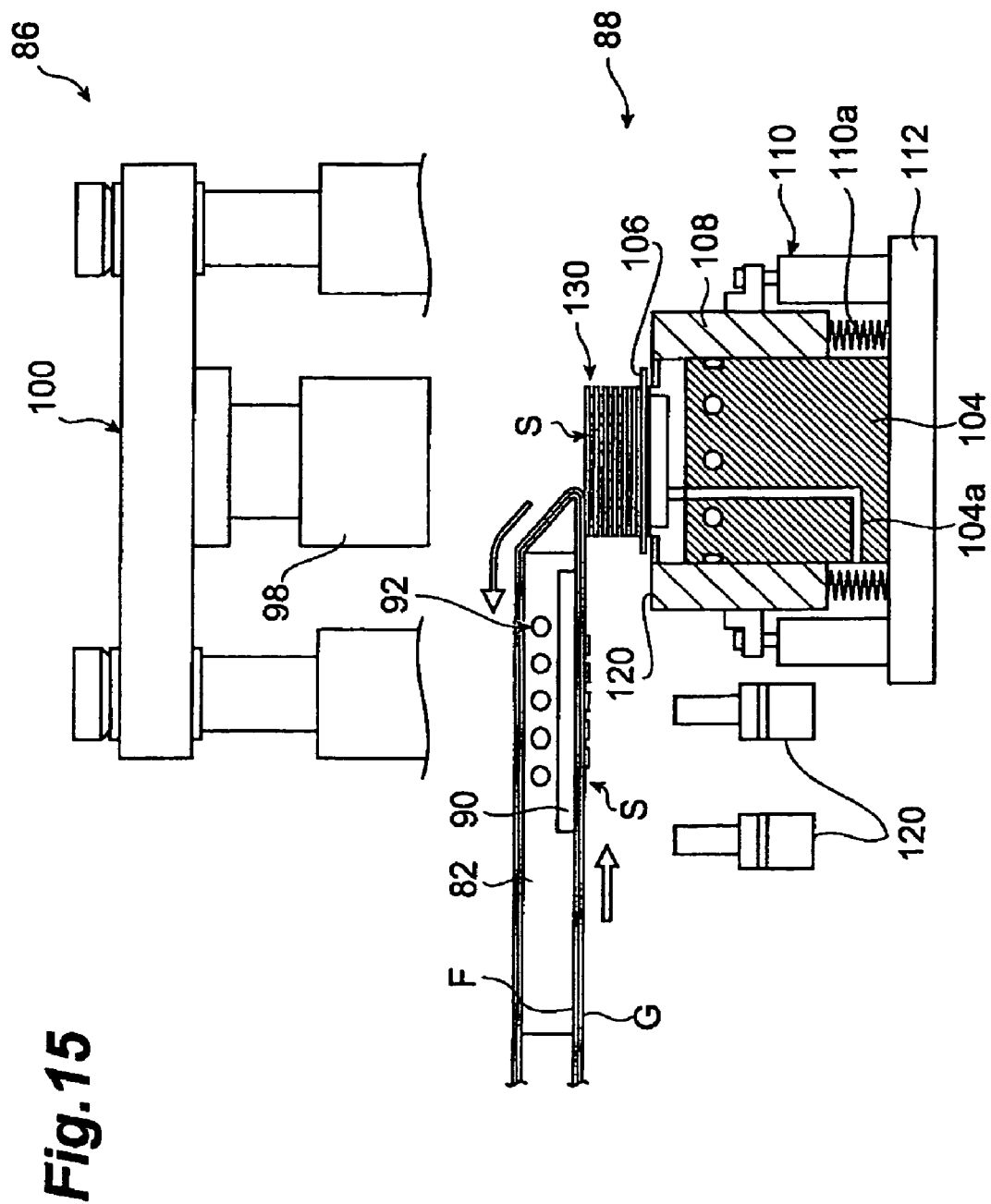
FIG. 15 is a figure showing a process in which the sheet pieces are laminated by using the laminating means of FIG. 7.

Thereafter, the conveying plate 82 is lifted up by a very small distance (distance larger than at least the thickness of the green sheet G) by the vertical drive portion 94 of the film conveying portion 84. Then, the conveying plate 82 is moved by the horizontal drive portion 96 so chat the conveying plate 82 recedes from between the press portion 86 and the laminating portion 88, in a state in which the abovementioned film fixing portion 97 stops the movement of the carrier film F located upper than the laminating means 80 (see FIG. 15). Accordingly, the portion of the carrier film F from which the sheet piece S is released comes around the upper surface of the conveying plate 82 at the end portion 82a. At this moment, the sheet piece S is completely released from the carrier film F. Therefore, the film conveying portion 84 having the conveying plate 82 functions as the release means of the present invention.

When the conveying plate 82 is moved by the horizontal drive portion 96, a new sheet piece S1 is placed on the position of the film adhering portion 90 provided on the lower surface of the conveying plate 82. Multilayer lamination by means of the laminating means 80 can be performed by repeating lamination of new sheet pieces S1.

In the apparatus 10 described above, the cutting means 20 and the laminating means 80 are placed on the conveying path P of the carrier film conveyed by the conveying means 15. Specifically, cutting of the green sheet G and lamination of the sheet pieces S are carried out on a single conveying path P. Therefore, production efficiency is improved, compared to the conventional apparatus in which cutting of the green sheet G and lamination of the sheet pieces S are carried out on separate conveying paths P.

Further, the laminating means 80 is positioned downstream from the cutting means 20 on the conveying path P, thus the position of the cutting means 20 is different from the position of the laminating means 80. Therefore, even when cut scraps are generated when the sheet piece S is cut by the cutting means 20, the cut scraps are significantly prevented from entering between layers in the laminated body 130. Furthermore, in the vicinity of the cutting means 20 the carrier film F extends in the vertical direction, thus, even when cut scraps are generated, the carrier film F is dropped easily.

Moreover, after a prescribed position of the ceramic green sheet G is sensed by the cameras 120 using the mark M provided on the green sheet G, the relative position of the carrier film F and holder 106 is adjusted automatically by the position adjustment means on the basis of the prescribed position.

It should be noted in the apparatus 10 that the film conveying portion 84 as the release means is moved relatively such that the carrier film F and the laminated body (lamination-subjected body) 130 separate from each other, to release the sheet piece S from the carrier film F.

The present invention is not to be limited to the embodiments described above, thus various modifications are possible. For example, the mark M may be formed on the carrier film F instead of the green sheet G.

What is claimed is:

1. A laminating apparatus for a ceramic green sheet, comprises:
    conveying means for conveying a carrier film which holds a ceramic green sheet;
    cutting means for cutting the ceramic green sheet to obtain a sheet piece of a predetermined shape from the ceramic green sheet, the cutting means being positioned on a conveying path on which the carrier film is conveyed by the conveying means;
    laminating means for laminating the sheet piece, which is cut by the cutting means, on a lamination-subjected body together with the carrier film, the laminating means being positioned downstream from the cutting means on the conveying path; and
    release means for releasing the sheet piece from the carrier film,
    wherein the laminating means has a film conveying portion controlling a position of a conveying plate which conveys the carrier film holding the ceramic green sheet, a press portion pressing the conveying plate, and a laminating portion laminating more than one of the sheet piece in succession on the carrier film, wherein the film conveying portion moves the conveying plate so as to lie between the press portion and the laminating portion, wherein the press portion presses down the conveying plate so as to laminate the sheet piece on the lamination-subjected body together with the carrier film, and wherein the film conveying portion moves the conveying plate so that the conveying plate recedes from between the press portion and laminating portion after the press portion presses down the conveying plate, whereby the carrier film comes around a face opposed to the press portion from a face opposed to the laminating portion at the end portion of the conveying plate.

2. The laminating apparatus for a ceramic green sheet according to claim 1, wherein a position adjustment mark is provided on at least either the ceramic green sheet or the carrier film, and at least either the cutting means or the laminating means further comprises:

mark sensing means for using the position adjustment mark to sense a prescribed position of the ceramic green sheet; and position adjustment means for performing position adjustment on the basis of the prescribed position sensed by the mark sensing means.

3. The laminating apparatus for a ceramic green sheet according to claim 1, wherein the release means releases the sheet piece from the carrier film by moving the carrier film and the lamination-subjected body relatively so that the carrier film and the lamination-subjected body are separated from each other.

4. A laminating method for a ceramic green sheet, comprising the steps of:

cutting the ceramic green sheet to obtain a sheet piece of a predetermined shape from the ceramic green sheet by means of cutting means which is positioned on a conveying path of a carrier film holding the ceramic green sheet conveyed by conveying means;

laminating the sheet piece which is cut by the cutting means on a lamination-subjected body together with the carrier film, by means of laminating means which is positioned downstream from the cutting means on the conveying path; and releasing the sheet piece from the carrier film by means of release means, wherein the laminating means has a film conveying portion controlling a position of a conveying plate which conveys the carrier film holding the ceramic green sheet, a press portion pressing the conveying plate, and a laminating portion laminating more than one of the sheet piece in succession on the carrier film, wherein the film conveying portion moves the conveying plate so as to lie between the press portion and the laminating portion, wherein the press portion presses down the conveying plate so as to laminate the sheet piece on the lamination-subjected body together with the carrier film, and wherein the film conveying portion moves the conveying plate so that the conveying plate recedes from between the press portion and laminating portion after the press portion presses down the conveying plate, whereby the carrier film comes around a face opposed to the press portion from a face opposed to the laminating portion at the end portion of the conveying plate.

5. The laminating method for a ceramic green sheet according to claim 4, wherein a position adjustment mark is provided on at least either the ceramic green sheet or the carrier film, the laminating method for a ceramic green sheet further comprising, at least either before obtaining the sheet piece by means of the cutting means or before laminating the sheet piece on the lamination-subjected body by means of the laminating means, the steps of sensing a prescribed position of the ceramic green sheet using the position adjustment mark by means of mark sensing means, and performing position adjustment using position adjustment means, on the basis of the prescribed position sensed by the mark sensing means.

6. The laminating method for a ceramic green sheet according to claim 4, wherein, when releasing the sheet piece from the carrier film, the release means moves the carrier film and the lamination-subjected body relatively so that the carrier film and the lamination-subjected body are separated from each other.

7. The laminating apparatus for a ceramic green sheet according to claim 1, wherein the film conveying portion moves the conveying plate so as to lift up by a distance larger than at least the thickness of the ceramic green sheet before the conveying plate recedes from between the press portion and the laminating portion.

8. The laminating method for a ceramic green sheet according to claim 4, wherein the film conveying portion moves the conveying plate so as to lift up by a distance larger than at least the thickness of the ceramic green sheet before the conveying plate recedes from between the press portion and the laminating portion.

* * * * *